(12) United States Patent
Taherzadeh Boroujeni et al.

(10) Patent No.: US 11,910,395 B2
(45) Date of Patent: Feb. 20, 2024

(54) INDICATION OF POWER BOOSTING FOR PHYSICAL DOWNLINK CONTROL CHANNEL AND ITS IMPACT ON SEARCH SPACE

(71) Applicant: QUALCOMM Incorporated, San Diego, CA (US)

(72) Inventors: Mahmoud Taherzadeh Boroujeni, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 197 days.

(21) Appl. No.: 17/374,324

(22) Filed: Jul. 13, 2021

(65) Prior Publication Data

US 2022/0053466 A1 Feb. 17, 2022

Related U.S. Application Data

(60) Provisional application No. 63/065,377, filed on Aug. 13, 2020.

(51) Int. Cl.
*H04W 72/23* (2023.01)
*H04L 1/00* (2006.01)
(Continued)

(52) U.S. Cl.
CPC .......... *H04W 72/23* (2023.01); *H04L 1/0038* (2013.01); *H04W 52/04* (2013.01); *H04W 72/21* (2023.01)

(58) Field of Classification Search
CPC ..... H04W 72/23; H04W 72/21; H04W 52/04; H04L 1/0038
(Continued)

(56) References Cited

U.S. PATENT DOCUMENTS 10,667,158 B2 * 5/2020 Almalfouh ........ H04W 56/0035
2010/0303011 A1 * 12/2010 Pan ...................... H04L 5/001
370/328
(Continued)

OTHER PUBLICATIONS

Intel Corporation: "NAICS Receivers for Downlink Control Channel", 3GPP Draft, 3GPP TSG RAN WG1 Meeting #76, R1-140139 NAICS Receivers for Downlink Control Channel, 3rd Generation Partnership Project (3GPP), vol. RAN WG1, No. Prague, Czech Republic, Feb. 10, 2014-Feb. 14, 2014 Feb. 9, 2014 (Feb. 9, 2014), XP050735703, 7 Pages, Retrieved from the Internet: URL:http://www.3gpp.org/ftp/Meetings_3GPP_SYNC/RAN/RAN1/Docs/ [retrieved on Feb. 9, 2014] Section 2, p. 5-p. 6.
(Continued)

*Primary Examiner* — Chi Tang P Cheng
(74) *Attorney, Agent, or Firm* — Procopio, Cory, Hargreaves & Savitch LLP

(57) ABSTRACT

Aspects presented herein may improve the efficiency of power boosting of PDCCH by a base station and the blind PDCCH detection/decoding performed by a UE. In one aspect, the UE receives, from a base station, a power boost indication for a PDCCH. The UE determines at least one search space based on the power boost indication from the base station. The UE monitors for the PDCCH with the indicated power boost from the base station in the at least one search space. In another aspect, a base station transmits, to a UE, a power boost indication for a PDCCH. The base station applies a power boost to the PDCCH. The base station transmits the PDCCH with the power boost to the UE.

31 Claims, 11 Drawing Sheets

(51) Int. Cl.
*H04W 52/04* (2009.01)
*H04W 72/21* (2023.01)

(58) Field of Classification Search
USPC .......................................................... 370/329
See application file for complete search history.

(56) References Cited

U.S. PATENT DOCUMENTS

2019/0053140 A1* 2/2019 Wong ...................... H04L 67/12
2019/0306851 A1* 10/2019 Xu .................... H04W 52/0251

OTHER PUBLICATIONS

International Search Report and Written Opinion—PCT/US2021/042804—ISA/EPO—dated Nov. 4, 2021.

* cited by examiner

INDICATION OF POWER BOOSTING FOR PHYSICAL DOWNLINK CONTROL CHANNEL AND ITS IMPACT ON SEARCH SPACE

CROSS REFERENCE TO RELATED APPLICATION(S)

This application claims the benefit of and priority to U.S. Provisional Application Ser. No. 63/065,377, entitled "INDICATION OF POWER BOOSTING FOR PHYSICAL DOWNLINK CONTROL CHANNEL AND ITS IMPACT ON SEARCH SPACE" and filed on Aug. 13, 2020, which is expressly incorporated by reference herein in its entirety.

TECHNICAL FIELD

The present disclosure relates generally to communication systems, and more particularly, to wireless communication involving power boosting.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a user equipment (UE). In some aspects, the apparatus receives, from a base station, a power boost indication for a physical downlink control channel (PDCCH). The apparatus monitors for the PDCCH with the indicated power boost from the base station in at least one search space based on the power boost indication from the base station.

In an aspect of the disclosure, a method, a computer-readable medium, and an apparatus are provided for wireless communication at a base station. In some aspects, the apparatus transmits, to a UE, a power boost indication for a PDCCH. The apparatus applies a power boost to the PDCCH. The apparatus transmits the PDCCH with the power boost to the UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
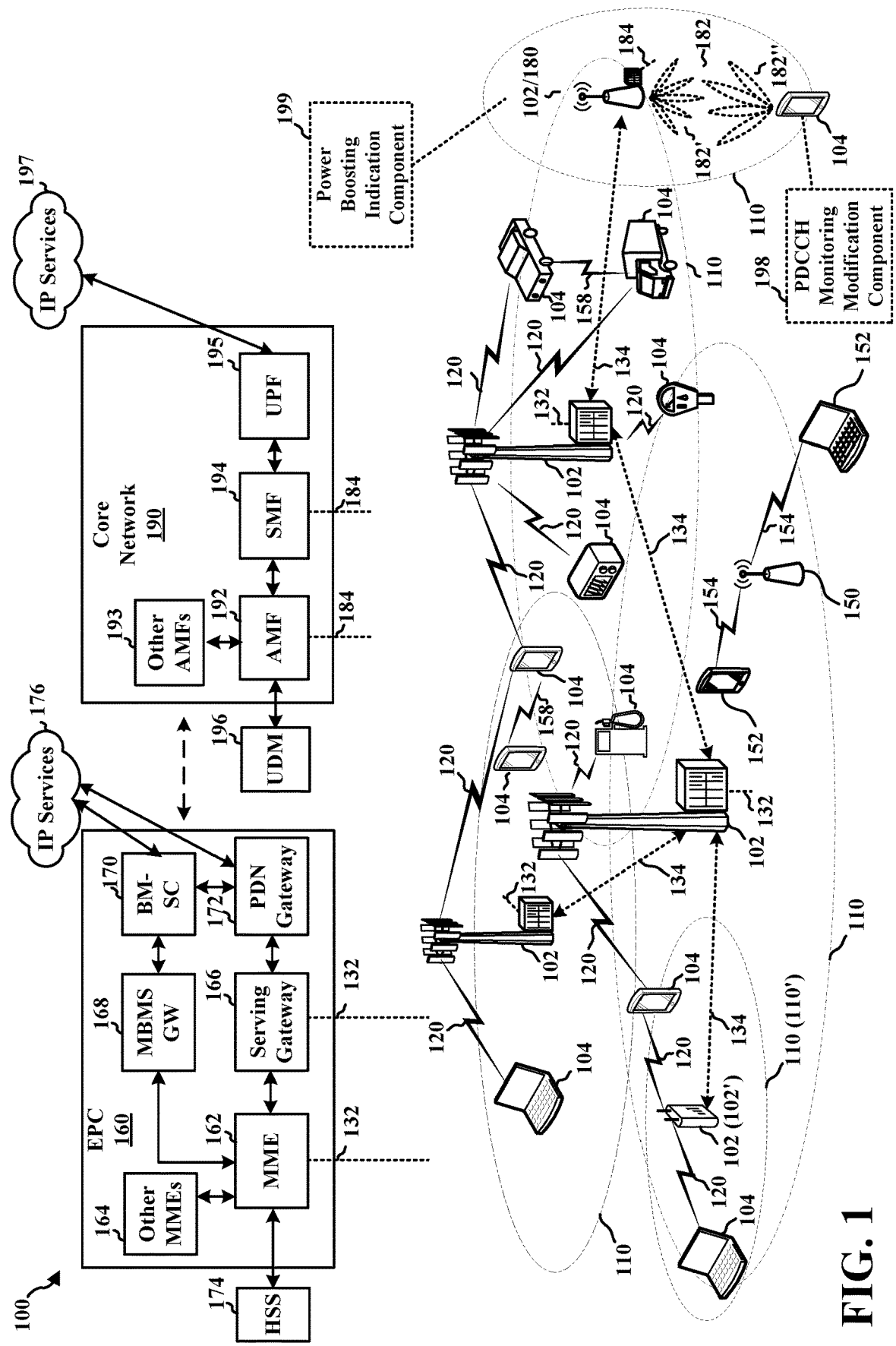
FIG. 1 is a diagram illustrating an example of a wireless communications system and an access network in accordance with aspects presented herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

In certain aspects, the UE 104 may include a PDCCH monitoring modification component 198 configured to modify the PDCCH monitoring based on whether there is a power boosting associated with the monitored PDCCH and/or the level of power boosting. For example, the PDCCH monitoring modification component 198 may be configured to receive a power boost indication for a PDCCH from a base station 102/180 and to monitor for PDCCH with the indicated power boost from the base station in at least one search space based on the power boost indication from the base station. For example, the UE may determine one or more search spaces to monitor based on the power boost indication from the bases station. Additionally or optionally, in certain aspects, the PDCCH monitoring modification component 198 may be configured to request the base station to lower the carrier aggregation level for the PDCCH to a threshold. In certain aspects, the base station 102/180 may include a power boosting indication component 199 configured to apply power boost to a PDCCH. The power boosting indication component 199 may indicate to the UE that the PDCCH is to be transmitted with the power boost before the transmission such that the UE may modify its PDCCH monitoring based at least in part on the power boost. Additionally, or alternatively, the power boosting indication component 199 may modify or configure the carrier aggregation level for transmitting the PDCCH based at least in part on the power boost applied to the PDCCH.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Figure 2A:
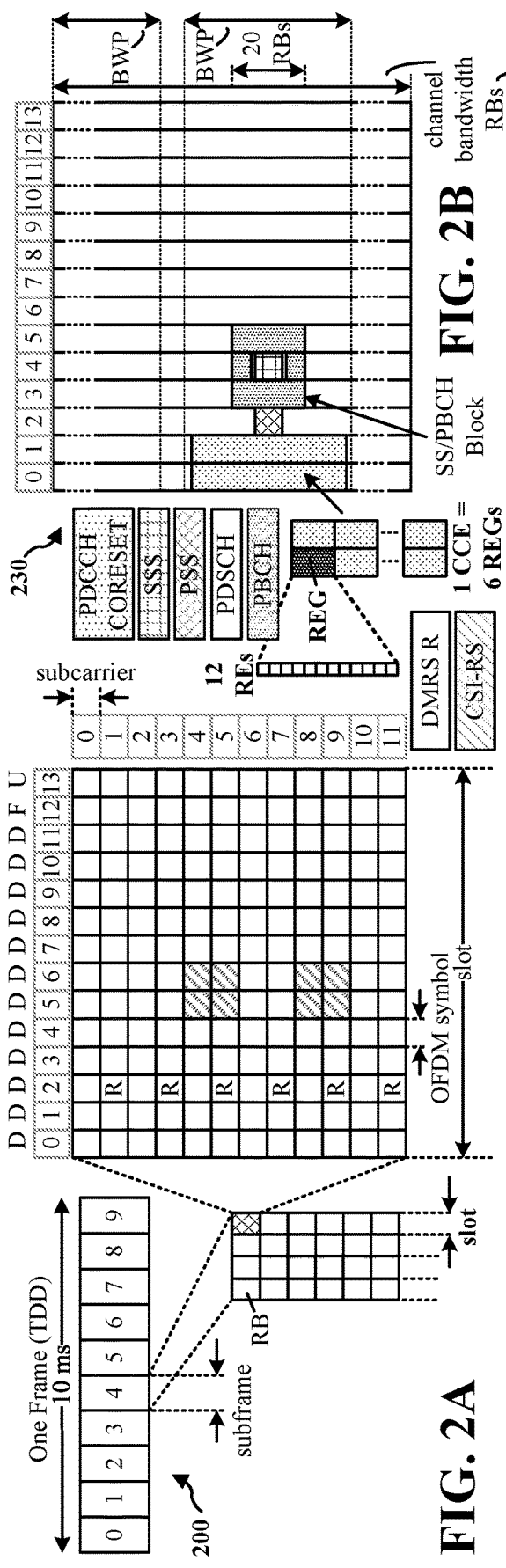
FIG. 2A is a diagram illustrating an example of a first frame, in accordance with various aspects of the present disclosure.
Figure 2B:
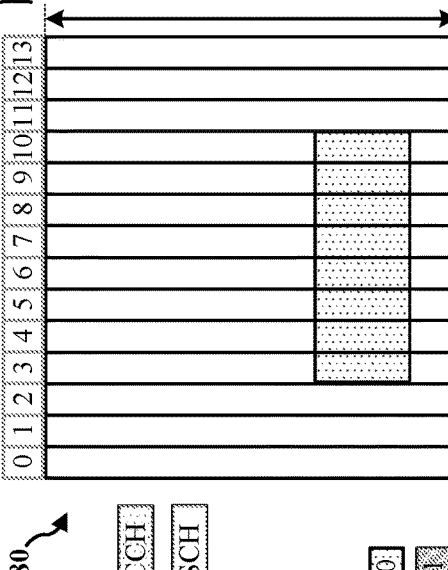
FIG. 2B is a diagram illustrating an example of DL channels within a subframe, in accordance with various aspects of the present disclosure.
Figure 2C:
FIG. 2C is a diagram illustrating an example of a second frame, in accordance with various aspects of the present disclosure.
Figure 2D:
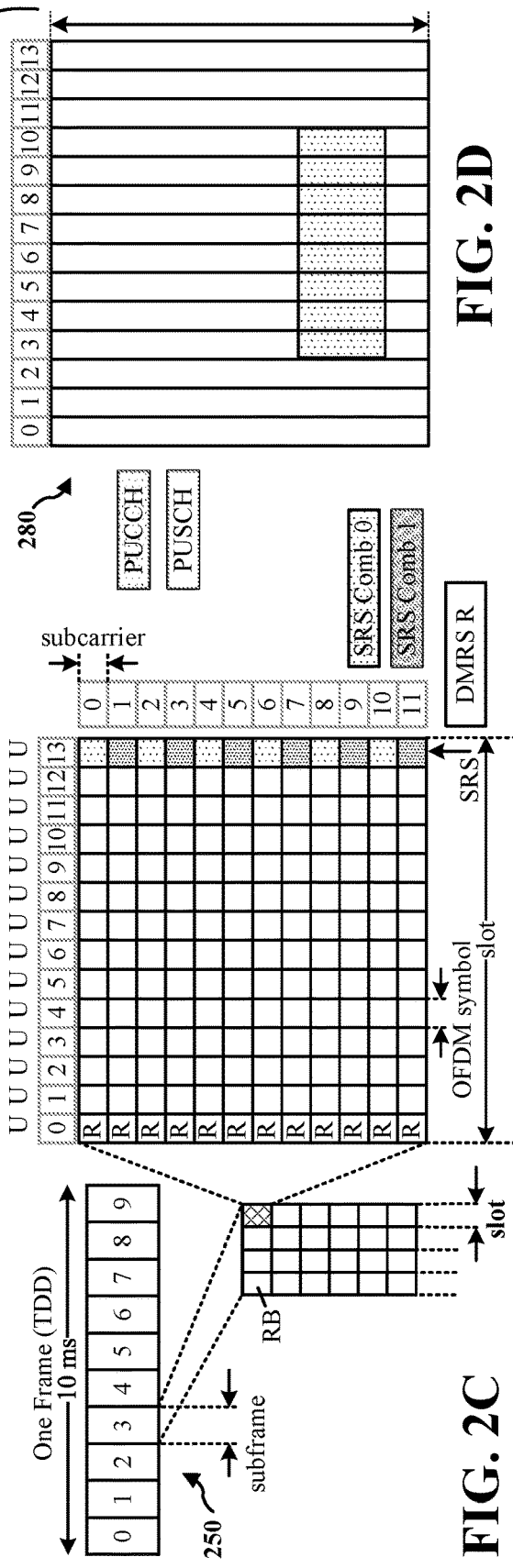
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15[\text{kHz}]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
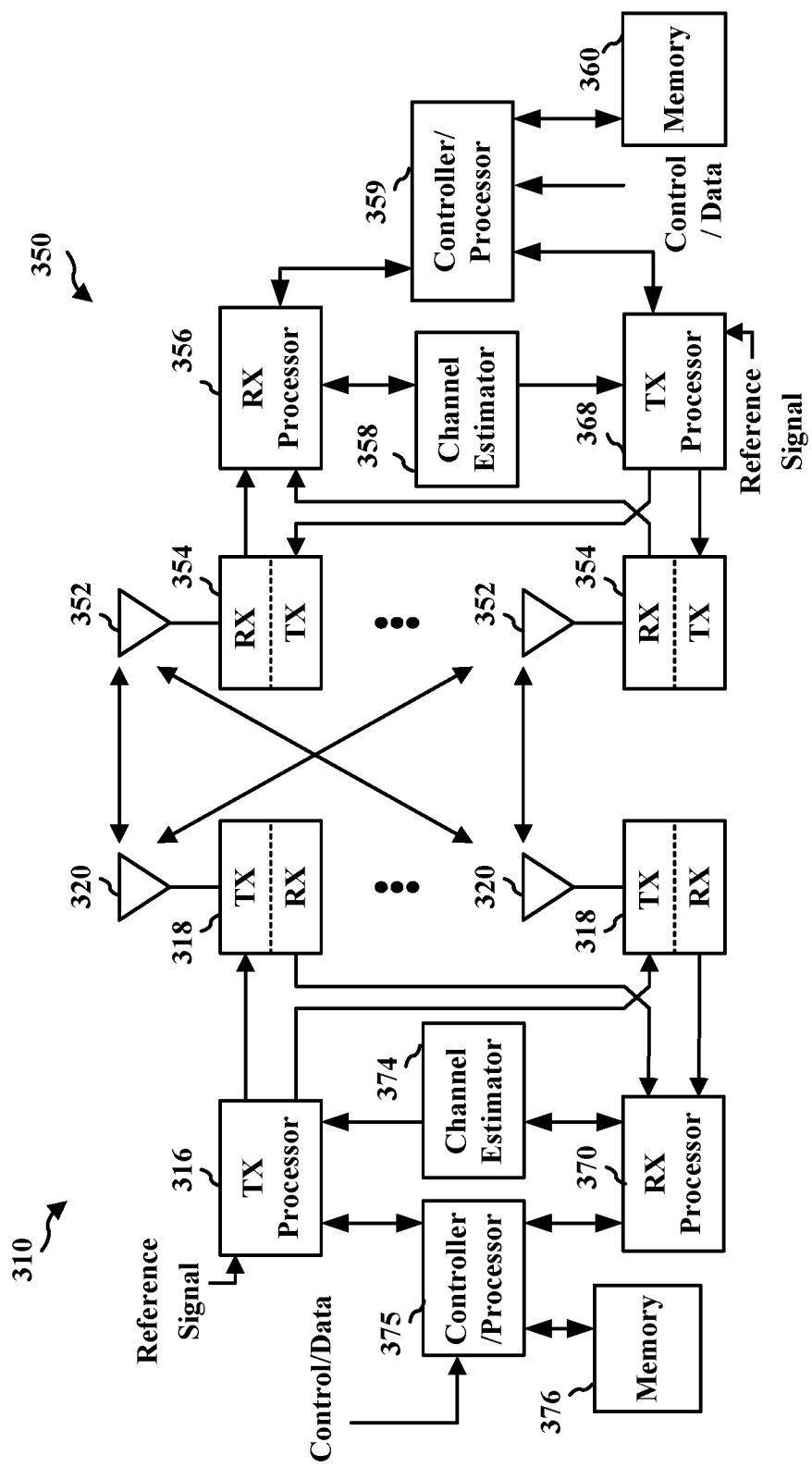
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the PDCCH monitoring modification component 198 of FIG. 1.

At least one of the TX processor 316, the RX processor 370, and the controller/processor 375 may be configured to perform aspects in connection with the power boosting indication component 199 of FIG. 1.

A communication network may support the use of bandwidth parts (BWPs), where a BWP may be a contiguous set of physical resource block (PRBs) on a given component carrier (CC). Thus, a BWP may include frequency resources that are contiguous in frequency. A wireless device/entity, such as a UE or a base station, may transmit and/or receive data and/or control channels within the BWP. The BWP may provide a network or a wireless device with more flexibility in assigning resources in a given CC as the BWP may enable multiplexing of different signals and signal types for a more efficient use of the frequency spectrum and of a UE power. A CC may be divided into multiple BWPs (e.g., one to four BWPs per CC) for uplink and/or downlink transmissions. For example, a UE may be configured with up to four downlink BWPs and up to four uplink BWPs for each serving cell. Although multiple BWPs may be defined in the downlink and the uplink, there may be one active BWP in the downlink and one active BWP in the uplink at a given time on an active serving cell. The active BWP may define a UE's operating bandwidth within the serving cell's operating bandwidth. The UE may not use BWPs that are configured for the UE but are not activated (e.g., deactivated or otherwise not in the active state) to transmit or receive data.

A BWP may further be configured with various parameters which may include numerology, frequency location, bandwidth size, and/or control resource set (CORESET), etc. A CORESET may define frequency domain resource blocks (RBs) and a time domain duration (e.g., a number of consecutive symbols) of a control region of a PDCCH. For example, a CORESET may correspond to a set of physical resources in time and frequency in which a UE may use for monitoring PDCCH and/or downlink control information (DCI), and each CORESET may include one or more RBs in the frequency domain and one or more symbols in the time domain. As an example, a CORESET may include multiple RBs in the frequency domain and 1, 2, or 3 contiguous symbols in the time domain. A resource element (RE) is a unit indicating one subcarrier in frequency over a single symbol in time. A control channel element (CCE) may include resource element groups (REGs), e.g., 6 REGs, in which an REG may correspond to one RB (e.g., 12 REs) during one OFDM symbol. REGs within a CORESET may be numbered in an increasing order in a time-first manner, starting with zero (0) for the first OFDM symbol and the lowest-numbered resource block in the control resource set. A UE may be configured with multiple CORESETs (e.g., up to three), each CORESET may be associated with a CCE-to-REG mapping. In some examples, a CORESET may be assigned with a CORESET identifier (ID). If a UE is configured to use up to four (4) BWPs in a transmission, the UE may be configured with up to twelve (12) CORESETs on a serving cell, where each CORESET may be assigned with an index of zero (0) to eleven (11) (e.g., CORESET #0, CORESET #1, CORESET #2, . . . , CORESET #11, etc.). CORESET with ID equals to zero (e.g., CORESET #0) may be configured by a master information block (MIB).

After a UE receives a PDCCH payload, the UE may perform a blind decoding on the PDCCH payload as the UE may not be aware of the control channel structure of the PDCCH, such as the number of control channels and the number of CCEs in which each control channel is mapped. As multiple PDCCHs may be transmitted by a base station in a given time (e.g., in a single subframe) and one or more PDCCHs within a transmission may not be dedicated to one UE (e.g., they may be dedicated to multiple UEs), a UE may find the PDCCH dedicated to the UE within the transmission by monitoring a set of PDCCH candidates (e.g., a set of consecutive CCEs on which a PDCCH could be mapped) in a given duration (e.g., every subframe). For example, the UE may try to blind decode each PDCCH candidate using a radio network temporary identifier (RNTI) associated with the UE or assigned to the UE. If a PDCCH candidate's cyclic redundancy check (CRC) is demasked by the UE's RNTI without a CRC error, the UE may determine that the PDCCH candidate carries the UE's control information (e.g., is dedicated to the UE).

When a UE performs a blind decoding for a set of PDCCH candidates, the set of PDCCH candidates to be monitored by the UE may be configured for the UE (e.g., by a base station) based on search space (SS) sets. For example, an SS set associated with a CORESET may define a slot pattern and/or a starting symbol of a control region in a slot. A UE may determine the slot for monitoring the SS set based on a periodicity, an offset, and/or a duration associated with the SS set. In some examples, there may be multiple types of SS sets, such as a common SS (CSS) set that is generally monitored by a group of UEs in a cell, and a UE-specific SS (USS) set that is monitored by a specific UE, etc. For example, a Type0-PDCCH CSS set may be used for PDCCH scheduling system information block 1 (SIB1), a Type0A-PDCCH CSS set may be used for PDCCH scheduling other system information (OSI), a Type1-PDCCH CSS set may be used for PDCCH relating to random access, a Type2-PDCCH CSS set may be used for PDCCH scheduling page message, a Type3-PDCCH CSS set may be used for all the other PDCCHs monitored in CSS, a USS set may be used for PDCCH scheduling UE specific data, etc.

Figure 4:
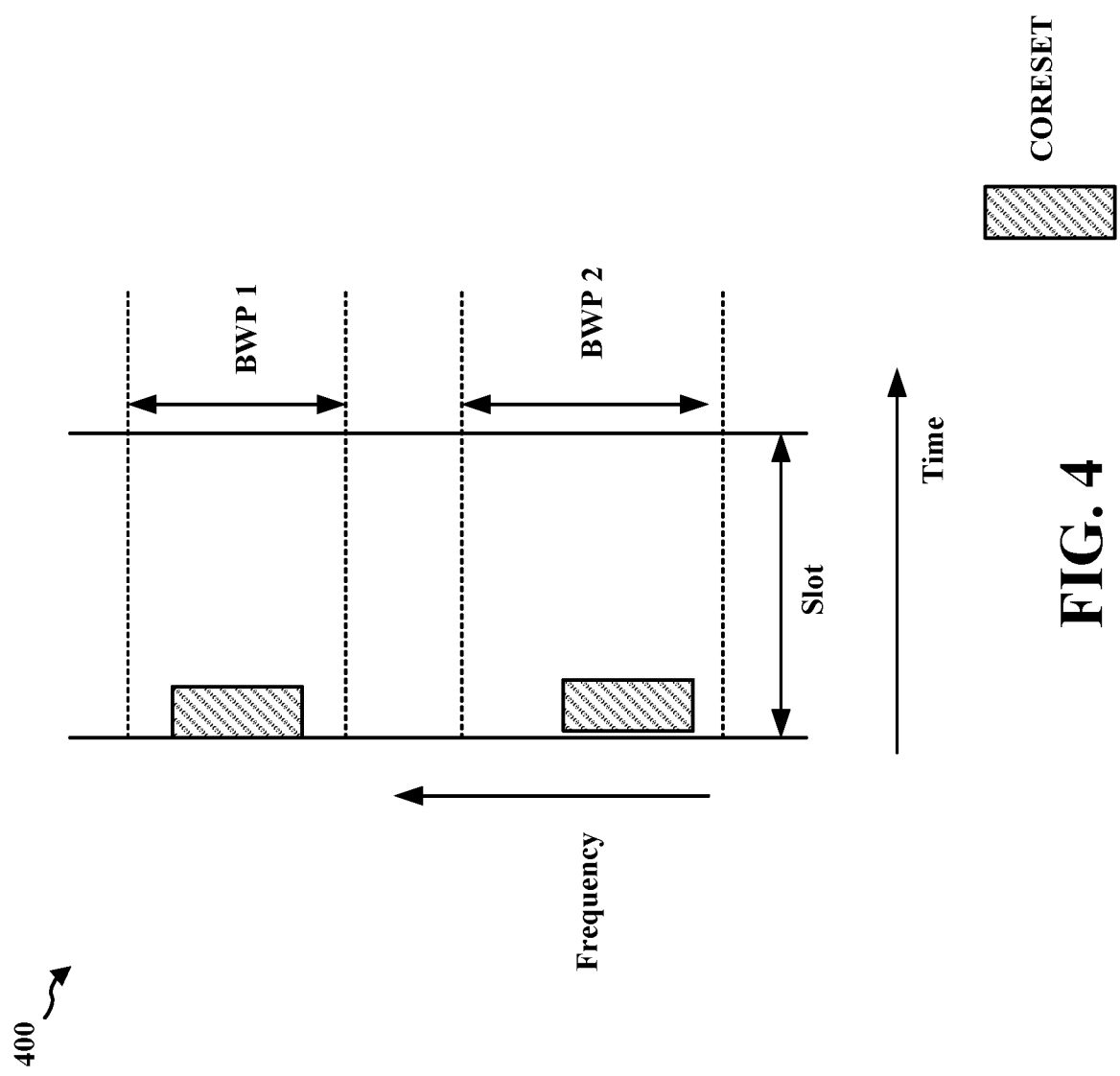
FIG. 4 is a diagram illustrating an example of time and frequency for multiple bandwidth parts (BWPs), and a control resource set (CORESET) for each BWP in accordance with various aspects of the present disclosure.

CORESETs may be defined at a cell level and a list of CORESETs to be monitored by a UE may be indicated to the UE in an active BWP. In other words, a base station may configure multiple CORESETs and multiple SS sets for a UE in an active BWP. For example, the base station may configure up to three (3) CORESETs and/or up to ten (10) SS sets per BWP for a UE. As a UE may be configured with multiple BWPs (e.g., up to four BWPs), the UE may be configured with up to 40 SS sets and 12 CORESETs, where each SS set may be assigned with an index of 0-39 and each CORESET may be assigned with an index of 0-11. Each SS set may be associated with a CORESET. Each CORESET ID of the CORESETs configured for the UE may map to a particular BWP, and each SS set ID of the multiple SS sets configured for the UE may map to a particular BWP, for example. FIG. 4 illustrates an example time and frequency diagram 400 showing multiple BWPs, and a CORESET for each BWP. In some examples, an SS may include a set of CCEs, e.g., at different aggregation levels. The SS may also indicate a number of candidates to be decoded, e.g., in which the UE performs decoding.

There may be limits on the number of PDCCH blind decodes that may be performed by a UE and/or on the total number of CCEs that may be covered by the UE's monitored PDCCH candidates, where the limits may be defined/configured per slot for the UE. In some examples, when the PDCCH blind detection limits are reached or surpassed for a UE, the UE may be configured to drop the SS with the last or largest SS index as there may be no differentiation among candidates inside an SS. In other examples, for higher frequencies and/or larger subcarrier spacings (e.g., which may correspond to shorter symbols), the available time for a UE to process the PDCCH may be relatively short compared to lower frequencies and/or smaller subcarrier spacings. This may further put pressure on the blind detection limits for a UE, such as by reducing the number of blind detections that may be performed by the UE within a given period. On the other hand, as a UE may consume power when performing the blind decoding, the UE may be able to reduce its power consumption (e.g., enable power saving) when the number of PDCCH blind decodes and/or the number of CCEs that are covered by the monitored candidates are reduced.

In some examples, to enhance transmission coverage and reliability, a base station may apply power boosting for transmission of PDCCH, where the base station may increase or concentrate the transmission power on control resources and/or on a specific PDCCH. This may provide UEs with improved coverage for performing the blind detection of PDCCH candidates, such as PDCCH candidates with a low aggregation level.

Aspects presented herein may improve the efficiency of a PDCCH power boosting by a base station and/or the efficiency of a blind PDCCH detection/decoding by a UE. Aspects presented herein may enable a base station to dynamically indicate a usage of power boosting to a UE, where the indication may dynamically change an active subset of a search space or a set of search spaces monitored by the UE (e.g., a subset of PDCCH candidates that are actively monitored by the UE).

Figure 5:
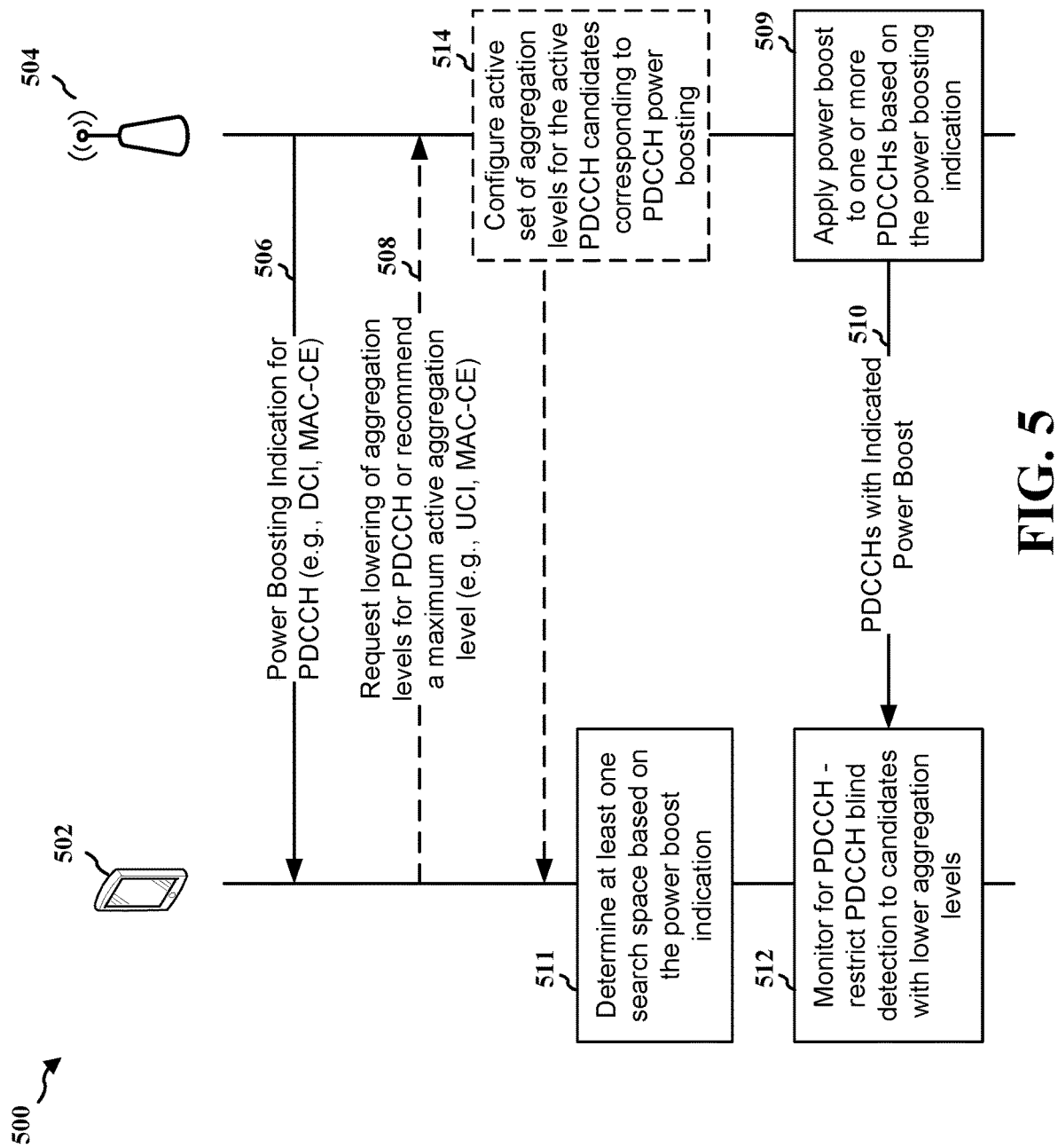
FIG. 5 is an example communication flow between a UE and a base station in accordance with various aspects of the present disclosure.

FIG. 5 is a communication flow 500 between a UE 502 and a base station 504 illustrating an example of dynamic power boosting indication for PDCCH(s) in accordance with various aspects of the present disclosure. At 506, the base station 504 may dynamically indicate or broadcast, to the UE 502 or a group of UEs including the UE 502, whether the base station 504 will apply power boosting to one or more PDCCHs and/or one or more control resources that are to be transmitted to the UE 502 (e.g., such as at 510) or the group of UEs.

After the UE 502 receives the power boosting indication, the UE 502 may modify a subset of PDCCH candidates that are actively monitored by the UE 502 (e.g., active subset of the SS or set of SS, etc.). For example, in the presence of the PDCCH power boosting, at 511, the UE 502 may determine at least one SS based at least in part on the power boost indication.

At 509, the base station 504 may apply power boost to one or more PDCCHs based on the power boosting indication transmitted at 506, and at 510, the base station 504 may transmit the PDCCHs with the indicated power boost to the UE 502.

At 512, the UE 502 may monitor for the PDCCH, where the UE 502 may restrict/limit its PDCCH blind detection(s) to PDCCH candidates (e.g., received at 510) with lower aggregation levels or with aggregation levels below a threshold (e.g. aggregation levels equal to or less than four (4), etc.). For example, the UE 502 may have SS candidates with aggregation levels 16, 8, 4, 2, and/or 1, etc. When the UE 502 receives the PDCCH power boosting indication from the base station 504, the UE 502 may limit the SS candidates (e.g., PDCCH candidates) with aggregation levels up to four (4). This may enable the UE 502 to concentrate the PDCCH candidates monitoring on PDCCH candidates with lower aggregation level to reduce a number of PDCCH candidates monitored and also to meet its blind detection limits. By reducing the number of PDCCH candidates monitored, the UE 502 may also reduce the power consumed during blind detections. In some examples, this may also increase the likelihood/probability that the UE 502 successfully decodes the PDCCH dedicated to the UE 502 as there may be less PDCCH candidates to be monitored and decoded. In some examples, the base station 504 may apply the PDCCH power boosting as a power concentration over a CORESET bandwidth (e.g., the CORESET associated with the SS or set of SS), and/or the base station 504 may apply the PDCCH power boosting as a power concentration over one PDCCH.

In one example, the base station 504 may indicate the PDCCH power boosting (e.g., at 506) via group common-DCI (GC-DCI) (e.g., for a group of UEs), via UE-specific DCI, and/or via a downlink media access control-control element (MAC-CE).

In another example, as shown at 514, the base station 504 may configure an active set of aggregation levels (e.g., for the active PDCCH candidates) for the UE 502 corresponding to the PDCCH power boosting, where the base station 504 may configure or associate different sets of aggregation levels with different levels of power boosting. For example, the base station 504 may configure/associated a level-4 aggregation (e.g., an aggregation with an aggregation level equals to or less than four (4)) with a first level of PDCCH power boosting, and the base station 504 may configure a level-8 aggregation (e.g., an aggregation with an aggregation level equals to or less than eight (8)) with a second level of PDCCH power boosting. As such, when the UE 502 receives an indication/configuration indicating the first level of PDCCH power boosting from the base station 504, the UE 502 may monitor for PDCCH(s) with carrier aggregation levels up to four, whereas when the UE 502 receives an indication/configuration indicating the second level of PDCCH power boosting from the base station 504, the UE 502 may monitor for PDCCH(s) with carrier aggregation levels up to eight. In some examples, the base station 504 may configure or define these rules or settings for the UE 502 via an SS configuration. As such, these rules or settings may be part of the SS configuration for the UE 502.

In some examples, as shown at 508, the UE 502 may request the base station 504 to lower the aggregation level of the PDCCH and/or to recommend a maximum active aggregation level for the PDCCH to the base station 504. The request and/or the recommendation from the UE 502 may be based on a set of predefined and/or preconfigured options. For example, to reduce power consumption when the UE 502 is at a low power (or at a power below a threshold), the UE 502 may request the base station 504 to lower the aggregation levels of the PDCCH to two (2), or request/recommend that the aggregation levels of the PDCCH not to exceed an amount (e.g., request that the maximum aggregation level be set to 4), etc. The UE 502 may submit the request (e.g., at 508) via UCI and/or a MAC-CE (e.g., for uplink). In some examples, the UE 502 may indicate the aggregation level request/recommendation to the base station 504 implicitly via other signaling, such as by indicating a UE capability or a UE's power consumption limitations, etc. For example, if the UE 502 indicates to the base station 504 that it is a reduced capability UE (e.g., having a lower capability than other UEs) or that the UE is configured with certain power consumption limitations, the base station 504 may configure lower aggregation levels for the UE 502 based on these implicit indication(s).

In some examples, aspects presented herein may be configured to apply to all search spaces, or apply to a subset of search spaces. For example, the dynamic indication of power boosting for PDCCH and/or its impact of the active PDCCH blind detection presented herein may apply to all search spaces, or it they may apply to a subset of the search spaces. In such an example, a UE may determine whether the power boost indication is to be applied to all search spaces or to a subset of search spaces based on the search space type (e.g., whether the search space is a CSS or USS), the associated RNTI, and/or their configuration, etc. For example, the base station 504 may apply PDCCH power boosting to the UE-specific search space, but not to the common search space, etc. As such, the UE 502 may expect PDCCH power boosting when the UE is configured with UE-specific search space, and the UE 502 may expect PDCCH power boosting when the UE is configured with common search space.

Figure 6:
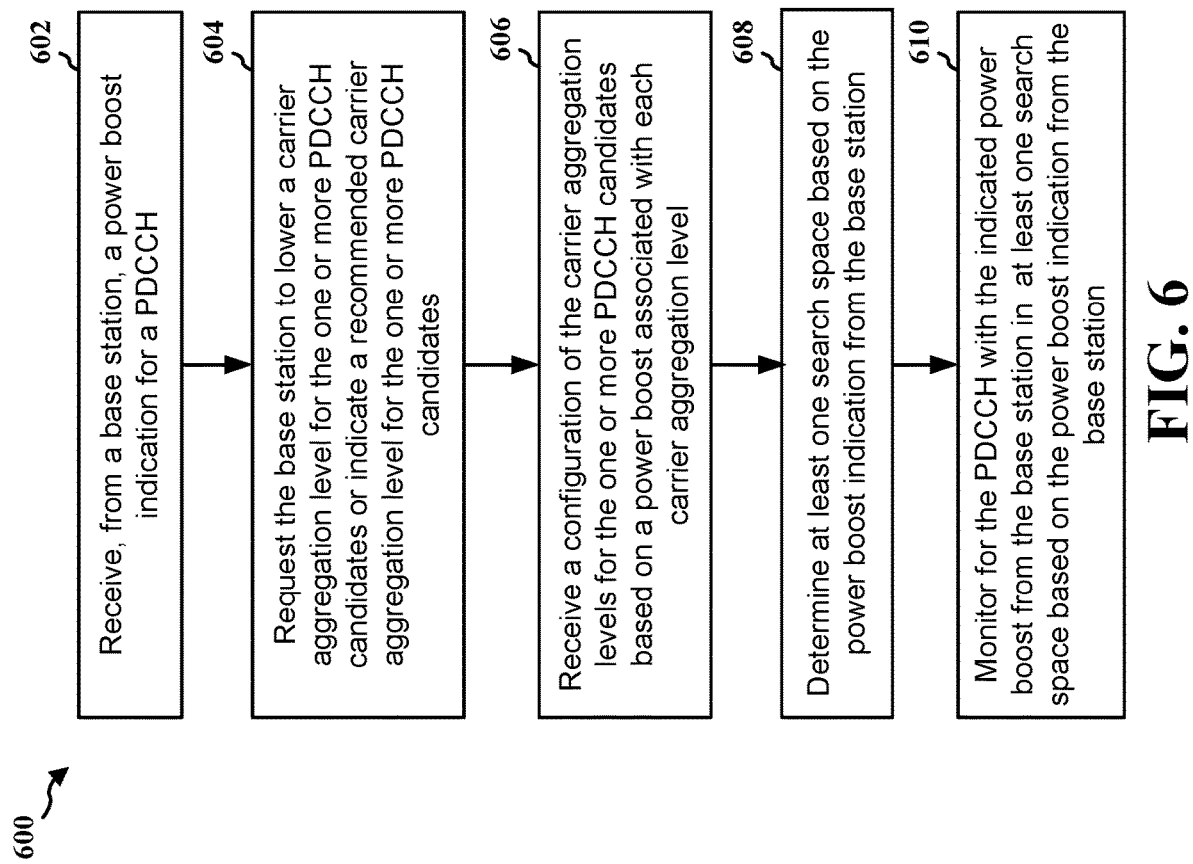
FIG. 6 is a flowchart of a method of wireless communication in accordance with aspects presented herein.

FIG. 6 is a flowchart 600 of a method of wireless communication. The method may be performed by a UE or a component of a UE (e.g., the UE 104, 350, 502; the apparatus 802; a processing system, which may include the memory 360 and which may be the entire UE 350 or a component of the UE 350, such as the TX processor 368, the RX processor 356, and/or the controller/processor 359). The method may enable the UE to modify its PDCCH and/or search space monitoring based at least in part on whether the PDCCH is associated with a power boost.

At 602, the UE may receive, from a base station, a power boost indication for a PDCCH, such as described in connection with FIG. 5. For example, at 506, the UE 502 may receive a power boost indication for PDCCH from the base station 504. The reception of the power boost indication may be performed by, e.g., the power boost indication process component 840 and/or the reception component 830 of the apparatus 802 in FIG. 8. In one example, the UE may receive the power boost indication in a group common DCI, a UE specific DCI or a downlink MAC-CE.

At 604, the UE may request the base station to lower a carrier aggregation level for the one or more PDCCH candidates or indicate a recommended carrier aggregation level for the one or more PDCCH candidates, such as described in connection with FIG. 5. For example, at 508, the UE 502 may request the base station 504 to lower the aggregation levels for PDCCH or recommend a maximum active aggregation level to the base station 054. The request or recommendation of the aggregation level may be performed by, e.g., the aggregation level request component 842 and/or the transmission component 834 of the apparatus 802 in FIG. 8. For example, the UE may request the base station to lower the carrier aggregation from 16 to 8, or from 8 to 4, or the UE may request the base station not to apply carrier aggregation above level 4, etc. The UE may transmit the request to the base station via an UCI or an uplink MAC CE.

In one example, the UE may implicitly notify the base station to reduce the carrier aggregation level or to keep the carrier aggregation level below a threshold. For example, the UE may indicate, to the base station, a UE capability (e.g., a reduced UE capability) or a power consumption limitation (e.g., maximum power in which the UE is permit to operate). Then, the UE may monitor for the one or more PDCCH candidates with a carrier aggregation level below a threshold based on the UE capability or the power consumption limitation.

In some examples, as shown at 606, prior to the UE determines at least one search space based on the power indication and/or prior to the UE monitors for the PDCCH with modified search space, the UE may receive a configuration of the carrier aggregation levels for the one or more PDCCH candidates based on a power boost associated with each carrier aggregation level, such as described in connection with 514 of FIG. 5. The reception of the configuration may be performed by, e.g., the aggregation configuration process component 844 and/or the reception component 830 of the apparatus 802 in FIG. 8.

In one example, the base station may associate a first carrier aggregation level with a first power boost, and a second carrier aggregation level with a second power boost, etc. In such an example, the base station may apply the first power boost to the PDCCH, and the base station may transmit the PDCCH using the first carrier aggregation level, and the base station may apply the second power boost to the PDCCH, and the base station may transmit the PDCCH using the second carrier aggregation level. In such an example, the first power boost and the second power boost may be different.

For example, as illustrated at 608, the UE may determine at least one search space based on the power boost indication from the base station, such as described in connection with FIG. 5. For example, at 511, the UE 502 may determine at least one SS based at least in part on the power boost indication. The determination of the at least one search space may be performed by, e.g., the search space determination component 846 of the apparatus 802 in FIG. 8.

In one example, the power boost indication may apply to each search space for the PDCCH. In another example, the power boost indication may apply to a subset of search spaces for the PDCCH.

At 610, the UE may monitor for the PDCCH with the indicated power boost from the base station in at least one search space based on the power boost indication from the base station, such as described in connection with FIG. 5. For example, at 512, the UE 502 may monitor for the PDCCH, where the UE 502 may restrict its PDCCH blind detection(s) to PDCCH candidates (e.g., received at 510) with lower aggregation levels. The monitoring of the PDCCH with the indicated power boost may be performed by, e.g., the PDCCH monitor component 848 and/or the reception component 830 of the apparatus 802 in FIG. 8.

In one example, the UE may perform blind decoding for at least a subset of one or more PDCCH candidates based on carrier aggregation levels associated with the one or more PDCCH candidate. In such an example, the UE may perform the blind decoding for the subset of the one or more PDCCH candidates that have carrier aggregation levels below a threshold (e.g., below level 4), such as described in connection with FIG. 5.

Figure 7:
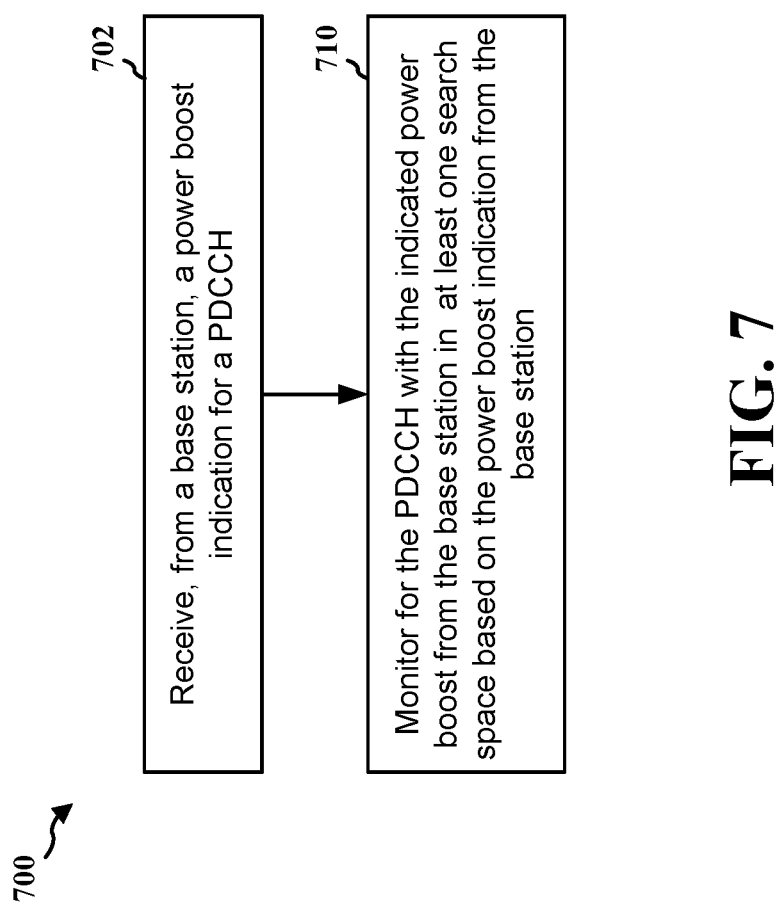
FIG. 7 is a flowchart of a method of wireless communication in accordance with aspects presented herein.

FIG. 7 is a flowchart 700 of a method of wireless communication. The method may be performed by a UE or a component of a UE (e.g., the UE 104, 350, 502; the apparatus 802; a processing system, which may include the memory 360 and which may be the entire UE 350 or a component of the UE 350, such as the TX processor 368, the RX processor 356, and/or the controller/processor 359). The method may enable the UE to modify its PDCCH and/or search space monitoring based at least in part on whether the PDCCH is associated with a power boost.

At 702, the UE may receive, from a base station, a power boost indication for a PDCCH, such as described in connection with FIG. 5. For example, at 506, the UE 502 may receive a power boost indication for PDCCH from the base station 504. The reception of the power boost indication may be performed by, e.g., the power boost indication process component 840 and/or the reception component 830 of the apparatus 802 in FIG. 8. In one example, the UE may receive the power boost indication in a group common DCI, a UE specific DCI or a downlink MAC-CE.

In one example, the UE may request the base station to lower a carrier aggregation level for the one or more PDCCH candidates or indicate a recommended carrier aggregation level for the one or more PDCCH candidates, such as described in connection with FIG. 5. For example, at 508, the UE 502 may request the base station 504 to lower the aggregation levels for PDCCH or recommend a maximum active aggregation level to the base station 054. The request or recommendation of the aggregation level may be performed by, e.g., the aggregation level request component 842 and/or the transmission component 834 of the apparatus 802 in FIG. 8. For example, the UE may request the base station to lower the carrier aggregation from 16 to 8, or from 8 to 4, or the UE may request the base station not to apply carrier aggregation above level 4, etc. The UE may transmit the request to the base station via an UCI or an uplink MAC CE.

In one example, the UE may implicitly notify the base station to reduce the carrier aggregation level or to keep the carrier aggregation level below a threshold. For example, the UE may indicate, to the base station, a UE capability (e.g., a reduced UE capability) or a power consumption limitation (e.g., maximum power in which the UE is permit to operate). Then, the UE may monitor for the one or more PDCCH candidates with a carrier aggregation level below a threshold based on the UE capability or the power consumption limitation.

In some examples, prior to the UE determines at least one search space based on the power indication and/or prior to the UE monitors for the PDCCH with modified search space, the UE may receive a configuration of the carrier aggregation levels for the one or more PDCCH candidates based on a power boost associated with each carrier aggregation level, such as described in connection with 514 of FIG. 5. The reception of the configuration may be performed by, e.g., the aggregation configuration process component 844 and/or the reception component 830 of the apparatus 802 in FIG. 8.

In one example, the base station may associate a first carrier aggregation level with a first power boost, and a second carrier aggregation level with a second power boost, etc. In such an example, the base station may apply the first power boost to the PDCCH, and the base station may transmit the PDCCH using the first carrier aggregation level, and the base station may apply the second power boost to the PDCCH, and the base station may transmit the PDCCH using the second carrier aggregation level. In such an example, the first power boost and the second power boost may be different.

In some aspects, the UE may determine at least one search space based on the power boost indication from the base station, such as described in connection with FIG. 5. For example, at 511, the UE 502 may determine at least one SS based at least in part on the power boost indication. The determination of the at least one search space may be performed by, e.g., the search space determination component 846 of the apparatus 802 in FIG. 8.

In one example, the power boost indication may apply to each search space for the PDCCH. In another example, the power boost indication may apply to a subset of search spaces for the PDCCH.

At 710, the UE may monitor for the PDCCH with the indicated power boost from the base station in at least one search space based on the power boost indication from the base station, such as described in connection with FIG. 5. For example, at 512, the UE 502 may monitor for the PDCCH, where the UE 502 may restrict its PDCCH blind detection(s) to PDCCH candidates (e.g., received at 510) with lower aggregation levels. The monitoring of the PDCCH with the indicated power boost may be performed by, e.g., the PDCCH monitor component 848 and/or the reception component 830 of the apparatus 802 in FIG. 8.

In one example, the UE may perform blind decoding for at least a subset of one or more PDCCH candidates based on carrier aggregation levels associated with the one or more PDCCH candidate. In such an example, the UE may perform the blind decoding for the subset of the one or more PDCCH candidates that have carrier aggregation levels below a threshold (e.g., below level 4), such as described in connection with FIG. 5.

Figure 8:
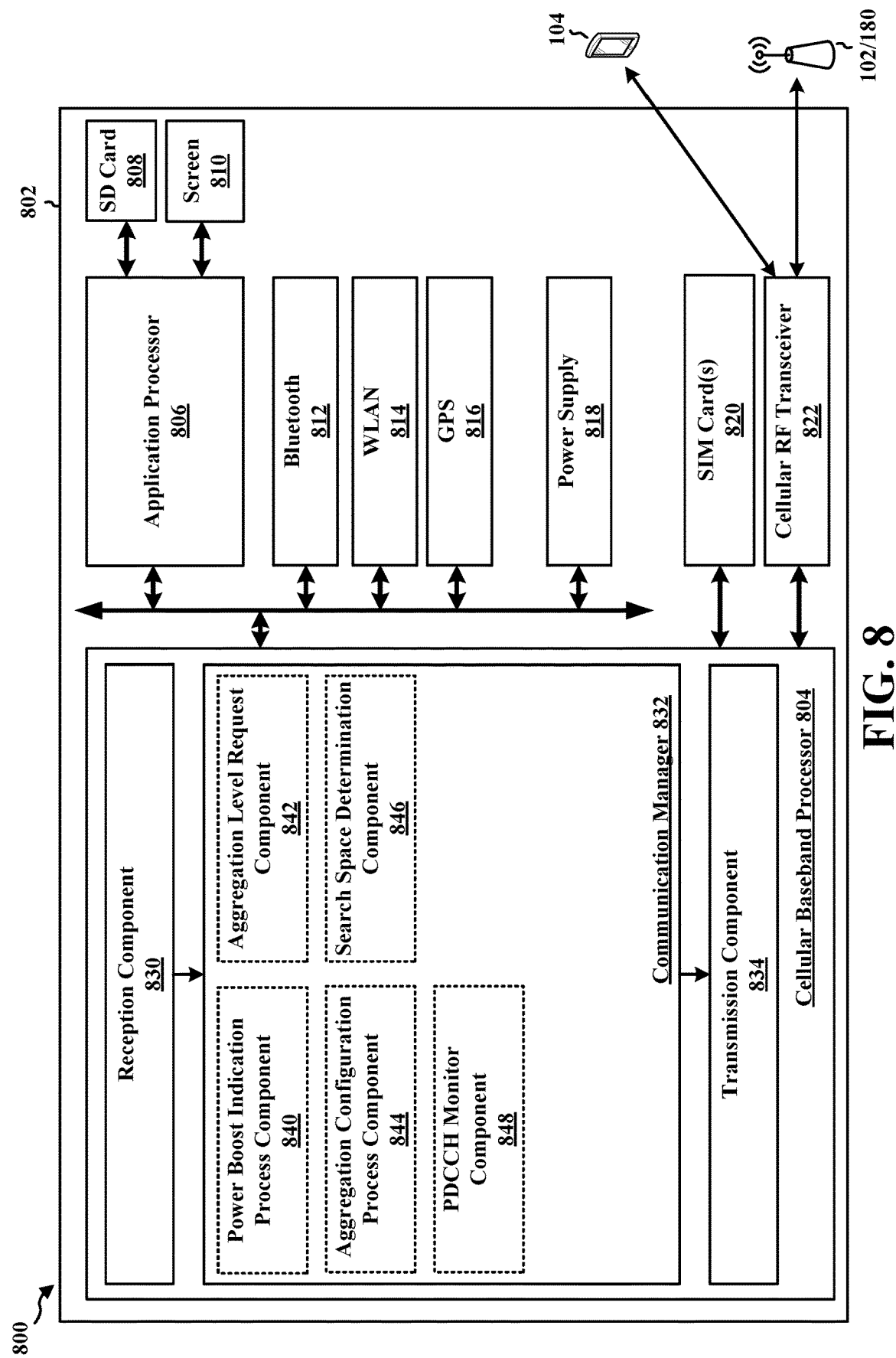
FIG. 8 is a diagram illustrating an example of a hardware implementation for an example apparatus in accordance with aspects presented herein.

FIG. 8 is a diagram 800 illustrating an example of a hardware implementation for an apparatus 802. The apparatus 802 is a UE and includes a cellular baseband processor 804 (also referred to as a modem) coupled to a cellular RF transceiver 822 and one or more subscriber identity modules (SIM) cards 820, an application processor 806 coupled to a secure digital (SD) card 808 and a screen 810, a Bluetooth module 812, a wireless local area network (WLAN) module 814, a Global Positioning System (GPS) module 816, and a power supply 818. The cellular baseband processor 804 communicates through the cellular RF transceiver 822 with the UE 104 and/or BS 102/180. The cellular baseband processor 804 may include a computer-readable medium/memory. The computer-readable medium/memory may be non-transitory. The cellular baseband processor 804 is responsible for general processing, including the execution of software stored on the computer-readable medium/memory. The software, when executed by the cellular baseband processor 804, causes the cellular baseband processor 804 to perform the various functions described supra. The computer-readable medium/memory may also be used for storing data that is manipulated by the cellular baseband processor 804 when executing software. The cellular baseband processor 804 further includes a reception component 830, a communication manager 832, and a transmission component 834. The communication manager 832 includes the one or more illustrated components. The components within the communication manager 832 may be stored in the computer-readable medium/memory and/or configured as hardware within the cellular baseband processor 804. The cellular baseband processor 804 may be a component of the UE 350 and may include the memory 360 and/or at least one of the TX processor 368, the RX processor 356, and the controller/processor 359. In one configuration, the apparatus 802 may be a modem chip and include just the cellular baseband processor 804, and in another configuration, the apparatus 802 may be the entire UE (e.g., see 350 of FIG. 3) and include the additional modules of the apparatus 802.

The communication manager 832 includes a power boost indication process component 840 that is configured to receive, from a base station, a power boost indication for a PDCCH, e.g., as described in connection with 602 of FIG. 6 and/or 702 of FIG. 7. The communication manager 832 includes an aggregation level request component 842 that is configured to request the base station to lower a carrier aggregation level for the one or more PDCCH candidates or indicate a recommended carrier aggregation level for the one or more PDCCH candidates, e.g., as described in connection with 604 of FIG. 6. The communication manager 832 includes an aggregation configuration process component 844 that is configured to receive a configuration of the carrier aggregation levels for the one or more PDCCH candidates based on a power boost associated with each carrier aggregation level, e.g., as described in connection with 606 of FIG. 6. The communication manager 832 further includes a search space determination component 846 that is configured to determine at least one search space based on the power boost indication from the base station, e.g., as described in connection with 608 of FIG. 6. The communication manager 832 further includes a PDCCH monitor component 848 that is configured to monitor for the PDCCH with the indicated power boost from the base station in the at least one search space, e.g., as described in connection with 610 of FIG. 6 and/or 710 of FIG. 7.

The apparatus may include additional components that perform each of the blocks of the algorithm in the flowcharts of FIGS. 6 and 7. As such, each block in the flowcharts of FIGS. 6 and 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 802, and in particular the cellular baseband processor 804, includes means for receiving, from a base station, a power boost indication for a PDCCH (e.g., the power boost indication process component 840 and/or the reception component 830). The apparatus 802 includes means for requesting the base station to lower a carrier aggregation level for the one or more PDCCH candidates or indicate a recommended carrier aggregation level for the one or more PDCCH candidates (e.g., the aggregation level request component 842 and/or the transmission component 834). The apparatus 802 includes means for receiving a configuration of the carrier aggregation levels for the one or more PDCCH candidates based on a power boost associated with each carrier aggregation level (e.g., the aggregation configuration process component 844 and/or the reception component 830). The apparatus 802 includes means for determining at least one search space based on the power boost indication from the base station (e.g., the search space determination component 846). The apparatus 802 includes means for monitoring for the PDCCH with the indicated power boost from the base station in the at least one search space (the PDCCH monitor component 848 and/or the reception component 830).

The means may be one or more of the components of the apparatus 802 configured to perform the functions recited by the means. As described supra, the apparatus 802 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 9:
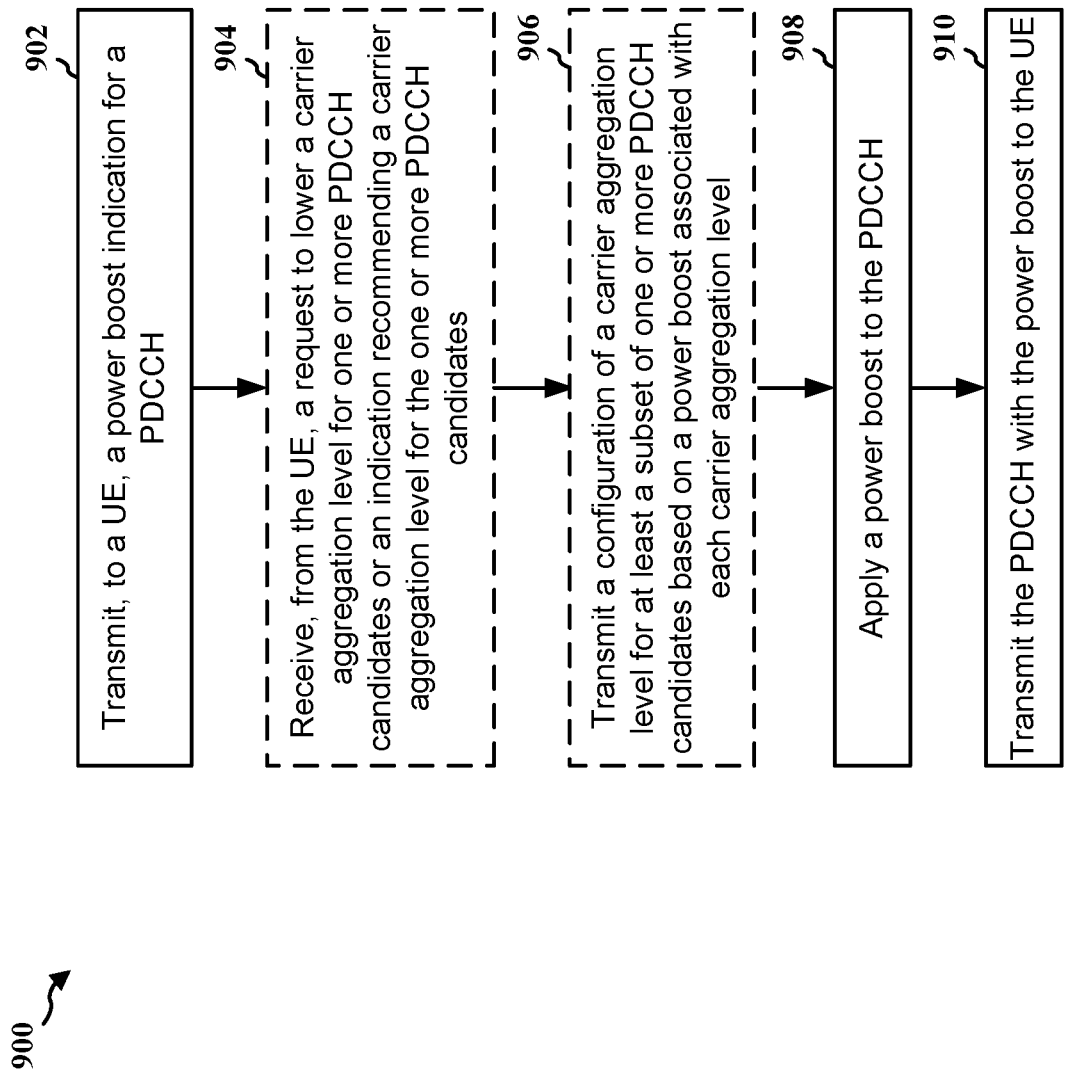
FIG. 9 is a flowchart of a method of wireless communication in accordance with aspects presented herein.

FIG. 9 is a flowchart 900 of a method of wireless communication. The method may be performed by a base station or a component of a base station (e.g., the base station 102, 180, 310, 504; the apparatus 1102; a processing system, which may include the memory 376 and which may be the entire base station 310 or a component of the base station 310, such as the TX processor 316 the RX processor 370, and/or the controller/processor 375). The method may enable a base station to apply a power boost to a PDCCH and indicate the power boost the power boost to a UE before transmitting the PDCCH such that the UE may modifying its PDCCH monitoring based at least in part on the indicated power boost. The method may also enable the base station to associate or modify the carrier aggregation level for transmitting the PDCCH based at least in part on the power boost applied to the PDCCH.

At 902, the base station may transmit, to a UE, a power boost indication for a PDCCH, such as described in connection with FIG. 5. For example, at 506, the base station 504 may transmit a power boost indication for PDCCH to the UE 502. The transmission of the power boost indication may be performed by, e.g., the power boost indication component 1140 and/or the transmission component 1134 of the apparatus 1102 in FIG. 11. In one example, the base station may transmit the power boost indication in a group common DCI, a UE specific DCI or a downlink MAC CE, etc.

In one example, as shown at 904, the base station may receive, from the UE, a request to lower a carrier aggregation level for one or more PDCCH candidates or an indication recommending a carrier aggregation level for the one or more PDCCH candidates, such as described in connection with FIG. 5. For example, at 508, the base station 504 may receive, from the UE 502, a request for lowering the aggregation levels for the PDCCH or a recommendation not to send the PDCCH with aggregation levels above a threshold (e.g., 4). The reception of the request or recommendation may be performed by, e.g., the aggregation level request process component 1142 and/or the reception component 1130 of the apparatus 1102 in FIG. 11.

In one example, in response to the UE's request, the base station may transmit the one or more PDCCH candidates with lowered carrier aggregation level or recommended carrier aggregation level based on the request or the indication. In such an example, the base station may receive the request or the indication from the UE via an UCI or an uplink MAC-CE.

In another example, the base station may receive, from the UE, a UE capability or a power consumption limitation. For example, the base station may receive an indication from the UE indicating a UE capability (e.g., a reduced UE capability) or a power consumption limitation (e.g., maximum power in which the UE is permit to operate). In response, the base station may transmit the PDCCH with a carrier aggregation at a lower level or below a threshold.

In another example, as shown at 906, the base station may transmit a configuration of a carrier aggregation level for at least a subset of one or more PDCCH candidates based on a power boost associated with each carrier aggregation level, such as described in connection with FIG. 5. For example, at 514, the base station 504 may configure the active set of aggregation levels (e.g., for the active PDCCH candidates) for the UE 502 corresponding to the PDCCH power boosting, where the base station 504 may configure or associate different sets of aggregation levels corresponding to different levels of power boosting. The transmission of the configuration may be performed by, e.g., the aggregation configuration component 1144 and/or the transmission component 1134 of the apparatus 1102 in FIG. 11.

At 908, the base station may apply the power boost to the PDCCH, such as described in connection with FIG. 5. For example, at 509, the base station 504 may apply power boost to one or more PDCCHs based on the power boost indication. The application of the power boost may be performed by, e.g., the power boost application component 1146 of the apparatus 1102 in FIG. 11.

In one example, the base station may apply the power boost as a power concentrate over a CORESET bandwidth in which the PDCCH is transmitted. In such an example, the base station may apply the power boost to one PDCCH.

In another example, the power boost may apply to each search space for the PDCCH, or the power boost may apply to a subset of search spaces for the PDCCH.

At 910, the base station may transmit the PDCCH with the power boost to the UE, such as described in connection with FIG. 5. For example, at 510, the base station 504 may transmit the PDCCH with the indicated power boost to the UE 502. The transmission of the PDCCH with the power boost may be performed by, e.g., the PDCCH power boost component 1148 and/or the transmission component 1134 of the apparatus 1102 in FIG. 11.

Figure 10:
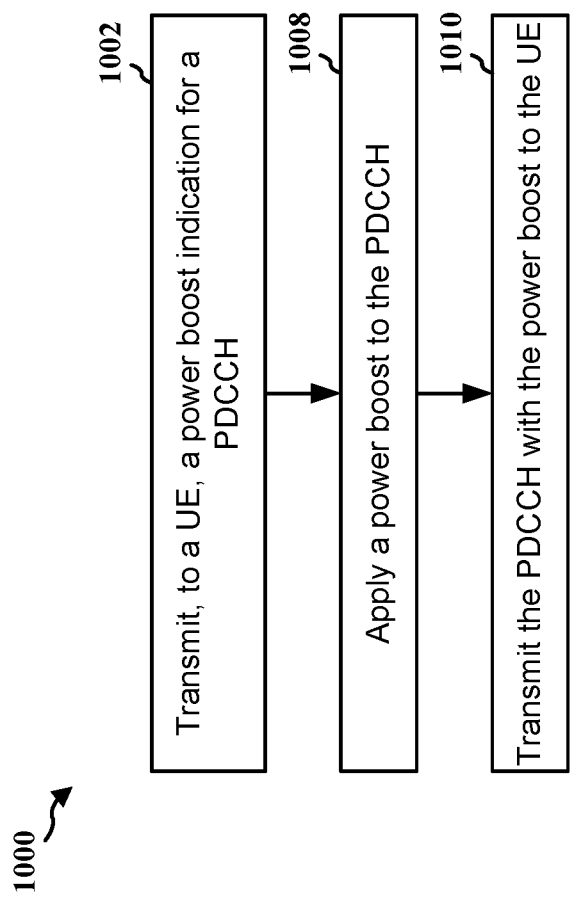
FIG. 10 is a flowchart of a method of wireless communication in accordance with aspects presented herein.

FIG. 10 is a flowchart 1000 of a method of wireless communication. The method may be performed by a base station or a component of a base station (e.g., the base station 102, 180, 310, 504; the apparatus 1102; a processing system, which may include the memory 376 and which may be the entire base station 310 or a component of the base station 310, such as the TX processor 316 the RX processor 370, and/or the controller/processor 375). The method may enable a base station to apply a power boost to a PDCCH and indicate the power boost the power boost to a UE before transmitting the PDCCH such that the UE may modifying its PDCCH monitoring based at least in part on the indicated power boost. The method may also enable the base station to associate or modify the carrier aggregation level for transmitting the PDCCH based at least in part on the power boost applied to the PDCCH.

At 1002, the base station may transmit, to a UE, a power boost indication for a PDCCH, such as described in connection with FIG. 5. For example, at 506, the base station 504 may transmit a power boost indication for PDCCH to the UE 502. The transmission of the power boost indication may be performed by, e.g., the power boost indication component 1140 and/or the transmission component 1134 of the apparatus 1102 in FIG. 11. In one example, the base station may transmit the power boost indication in a group common DCI, a UE specific DCI or a downlink MAC CE, etc.

In one example, the base station may receive, from the UE, a request to lower a carrier aggregation level for one or more PDCCH candidates or an indication recommending a carrier aggregation level for the one or more PDCCH candidates, such as described in connection with FIG. 5. For example, at 508, the base station 504 may receive, from the UE 502, a request for lowering the aggregation levels for the PDCCH or a recommendation not to send the PDCCH with aggregation levels above a threshold (e.g., 4). The reception of the request or recommendation may be performed by, e.g., the aggregation level request process component 1142 and/or the reception component 1130 of the apparatus 1102 in FIG. 11.

In another example, in response to the UE's request, the base station may transmit the one or more PDCCH candidates with lowered carrier aggregation level or recommended carrier aggregation level based on the request or the indication. In such an example, the base station may receive the request or the indication from the UE via an UCI or an uplink MAC-CE.

In another example, the base station may receive, from the UE, a UE capability or a power consumption limitation. For example, the base station may receive an indication from the UE indicating a UE capability (e.g., a reduced UE capability) or a power consumption limitation (e.g., maximum power in which the UE is permit to operate). In response, the base station may transmit the PDCCH with a carrier aggregation at a lower level or below a threshold.

In another example, the base station may transmit a configuration of a carrier aggregation level for at least a subset of one or more PDCCH candidates based on a power boost associated with each carrier aggregation level, such as described in connection with FIG. 5. For example, at 514, the base station 504 may configure the active set of aggregation levels (e.g., for the active PDCCH candidates) for the UE 502 corresponding to the PDCCH power boosting, where the base station 504 may configure or associate different sets of aggregation levels corresponding to different levels of power boosting. The transmission of the configuration may be performed by, e.g., the aggregation configuration component 1144 and/or the transmission component 1134 of the apparatus 1102 in FIG. 11.

At 1008, the base station may apply the power boost to the PDCCH, such as described in connection with FIG. 5. For example, at 509, the base station 504 may apply power boost to one or more PDCCHs based on the power boost indication. The application of the power boost may be performed by, e.g., the power boost application component 1146 of the apparatus 1102 in FIG. 11.

In one example, the base station may apply the power boost as a power concentrate over a CORESET bandwidth in which the PDCCH is transmitted. In such an example, the base station may apply the power boost to one PDCCH.

In another example, the power boost may apply to each search space for the PDCCH, or the power boost may apply to a subset of search spaces for the PDCCH.

At 1010, the base station may transmit the PDCCH with the power boost to the UE, such as described in connection with FIG. 5. For example, at 510, the base station 504 may transmit the PDCCH with the indicated power boost to the UE 502. The transmission of the PDCCH with the power boost may be performed by, e.g., the PDCCH power boost component 1148 and/or the transmission component 1134 of the apparatus 1102 in FIG. 11.

Figure 11:
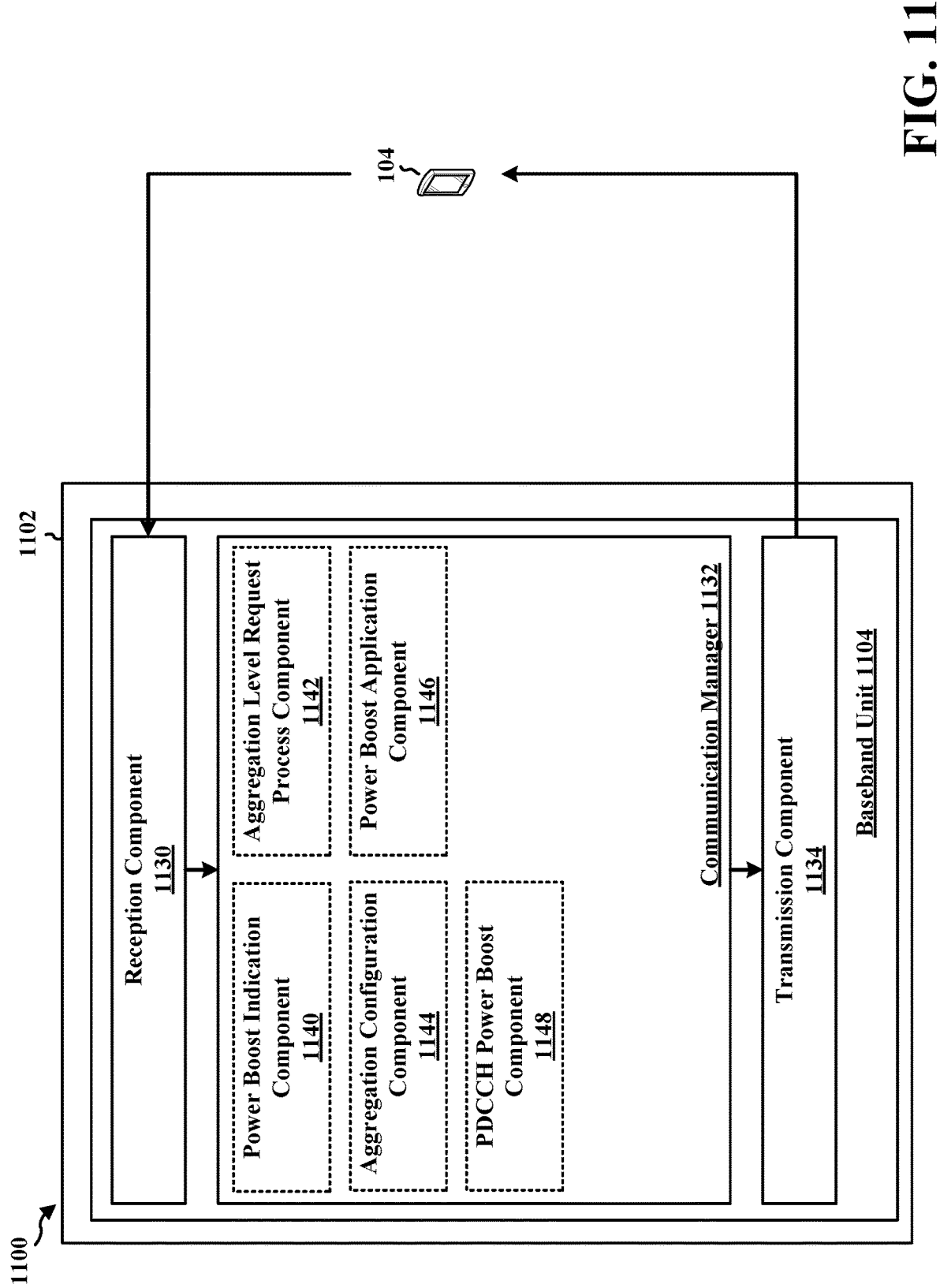
FIG. 11 is a diagram illustrating an example of a hardware implementation for an example apparatus in accordance with aspects presented herein.

FIG. 11 is a diagram 1100 illustrating an example of a hardware implementation for an apparatus 1102. The apparatus 1102 is a BS and includes a baseband unit 1104. The baseband unit 1104 may communicate through a cellular RF transceiver with the UE 104. The baseband unit 1104 may include a computer-readable medium/memory. The baseband unit 1104 is responsible for general processing, including the execution of software stored on the computer-readable medium/memory. The software, when executed by the baseband unit 1104, causes the baseband unit 1104 to perform the various functions described supra. The computer-readable medium/memory may also be used for storing data that is manipulated by the baseband unit 1104 when executing software. The baseband unit 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the baseband unit 1104. The baseband unit 1104 may be a component of the BS 310 and may include the memory 376 and/or at least one of the TX processor 316, the RX processor 370, and the controller/processor 375.

The communication manager 1132 includes a power boost indication component 1140 that is configured to transmit, to a UE, a power boost indication for a PDCCH, e.g., as described in connection with 902 of FIG. 9 and/or 1002 of FIG. 10. The communication manager 1132 includes an aggregation level request process component 1142 that is configured to receive, from the UE, a request to lower a carrier aggregation level for one or more PDCCH candidates or an indication recommending a carrier aggregation level for the one or more PDCCH candidates, e.g., as described in connection with 904 of FIG. 8. The communication manager 1132 includes an aggregation configuration component 1144 that is configured to transmit a configuration of a carrier aggregation level for at least a subset of one or more PDCCH candidates based on a power boost associated with each carrier aggregation level, e.g., as described in connection with 906 of FIG. 8. The communication manager 1132 further includes a power boost application component 1146 that is configured to apply the power boost to the PDCCH, e.g., as described in connection with 908 of FIG. 9 and/or 1008 of FIG. 10. The communication manager 1132 includes a PDCCH power boost component 1148 that is configured to transmit the PDCCH with the power boost to the UE, e.g., as described in connection with 910 of FIG. 9 and/or 1010 of FIG. 10.

The apparatus may include additional components that perform each of the blocks of the algorithm in the flowcharts of FIGS. 9 and 10. As such, each block in the flowcharts of FIGS. 9 and 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1102, and in particular the baseband unit 1104, includes means for transmitting, to a UE, a power boost indication for a PDCCH (e.g., the power boost indication component 1140 and/or the transmission component 1134). The apparatus 1102 includes means for receiving, from the UE, a request to lower a carrier aggregation level for one or more PDCCH candidates or an indication recommending a carrier aggregation level for the one or more PDCCH candidates (e.g., the aggregation level request process component 1142 and/or the reception component 1130). The apparatus 1102 includes means for transmitting a configuration of a carrier aggregation level for at least a subset of one or more PDCCH candidates based on a power boost associated with each carrier aggregation level (e.g., the aggregation configuration component 1144 and/or the transmission component 1134). The apparatus 1102 includes means for applying a power boost to the PDCCH (e.g., the power boost application component 1146). The apparatus 1102 includes means for transmitting the PDCCH with the power boost to the UE (e.g., the PDCCH power boost component 1148 and/or the transmission component 1134).

The means may be one or more of the components of the apparatus 1102 configured to perform the functions recited by the means. As described supra, the apparatus 1102 may include the TX Processor 316, the RX Processor 370, and the controller/processor 375. As such, in one configuration, the means may be the TX Processor 316, the RX Processor 370, and the controller/processor 375 configured to perform the functions recited by the means.

The following aspects are illustrative only and may be combined with other aspects or teachings described herein, without limitation.

Aspect 1 is an apparatus for wireless communication including at least one processor coupled to a memory and configured to: receive, from a base station, a power boost indication for a PDCCH; and monitor for the PDCCH with the indicated power boost from the base station in at least one search space based on the power boost indication from the base station.

Aspect 2 is the apparatus of aspect 1, where the power boost indication is received in a group common DCI, a UE specific DCI or a downlink MAC CE.

Aspect 3 is the apparatus of any of aspects 1 and 2, where the UE performs blind decoding for at least a subset of one or more PDCCH candidates based on carrier aggregation levels associated with the one or more PDCCH candidate.

Aspect 4 is the apparatus of any of aspects 1 to 3, where the blind decoding for the subset of the one or more PDCCH candidates that have carrier aggregation levels below a threshold.

Aspect 5 is the apparatus of any of aspects 1 to 4, where the at least one processor is further configured to receive a configuration of the carrier aggregation levels for the one or more PDCCH candidates based on a power boost associated with each carrier aggregation level.

Aspect 6 is the apparatus of any of aspects 1 to 5, where the at least one processor is further configured to transmit a request to the base station to lower a carrier aggregation level for the one or more PDCCH candidates or indicate a recommended carrier aggregation level for the one or more PDCCH candidates.

Aspect 7 is the apparatus of any of aspects 1 to 6, where the at least one processor is further configured to transmit the request to the base station via an UCI or an uplink MAC CE.

Aspect 8 is the apparatus of any of aspects 1 to 7, where the at least one processor is further configured to indicate, to the base station, a UE capability or a power consumption limitation; and monitoring for the one or more PDCCH candidates with a carrier aggregation level below a threshold based on the UE capability or the power consumption limitation.

Aspect 9 is the apparatus of any of aspects 1 to 8, where the UE capability is a reduced UE capability.

Aspect 10 is the apparatus of any of aspects 1 to 9, where the power boost indication applies to each search space for the PDCCH.

Aspect 11 is the apparatus of any of aspects 1 to 10, where the power boost indication applies to a subset of search spaces for the PDCCH.

Aspect 12 is the apparatus of any of aspects 1 to 11, further comprises a transceiver coupled to the at least one processor.

Aspect 13 is a method of wireless communication for implementing any of aspects 1 to 12.

Aspect 14 is an apparatus for wireless communication including means for implementing any of aspects 1 to 12.

Aspect 15 is a computer-readable medium storing computer executable code, where the code when executed by a processor causes the processor to implement any of aspects 1 to 12.

Aspect 16 is an apparatus for wireless communication including at least one processor coupled to a memory and configured to transmit, to a UE, a power boost indication for a PDCCH; apply a power boost to the PDCCH; and transmit the PDCCH with the power boost to the UE.

Aspect 17 is the apparatus of aspect 16, where the power boost indication is transmitted in a group common DCI, a UE specific DCI or a downlink MAC CE.

Aspect 18 is the apparatus of any of aspects 16 and 17, the power boost is applied as a power concentrate over a CORESET bandwidth in which the PDCCH is transmitted or the power boost is applied to the PDCCH.

Aspect 19 is the apparatus of any of aspects 16 to 18, where the at least one processor is further configured to transmit a configuration of a carrier aggregation level for at least a subset of one or more PDCCH candidates based on a power boost associated with each carrier aggregation level.

Aspect 20 is the apparatus of any of aspects 16 to 19, where the at least one processor is further configured to receive, from the UE, a request to lower a carrier aggregation level for one or more PDCCH candidates or an indication recommending a carrier aggregation level for the one or more PDCCH candidates; and transmit the one or more PDCCH candidates with lowered carrier aggregation level or recommended carrier aggregation level based on the request or the indication.

Aspect 21 is the apparatus of any of aspects 16 to 20, where the request or the indication is received from the UE via an UCI or an uplink MAC CE.

Aspect 22 is the apparatus of any of aspects 16 to 21, where the at least one processor is further configured to receive, from the UE, a UE capability or a power consumption limitation; and transmitting the one or more PDCCHs with a carrier aggregation level below a threshold.

Aspect 23 is the apparatus of any of aspects 16 to 22, where the UE capability is a reduced UE capability.

Aspect 24 is the apparatus of any of aspects 16 to 23, where the power boost indication applies to each search space for the PDCCH.

Aspect 25 is the apparatus of any of aspects 16 to 24, where the power boost indication applies to a subset of search spaces for the PDCCH.

Aspect 26 is the apparatus of any of aspects 16 to 25, further comprises a transceiver coupled to the at least one processor.

Aspect 27 is a method of wireless communication for implementing any of aspects 16 to 26.

Aspect 28 is an apparatus for wireless communication including means for implementing any of aspects 16 to 26.

Aspect 29 is a computer-readable medium storing computer executable code, where the code when executed by a processor causes the processor to implement any of aspects 16 to 26.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An apparatus for wireless communication at a user equipment (UE), comprising:
   memory; and
   at least one processor coupled to the memory and configured to:
   receive, from a base station, a power boost indication for a physical downlink control channel (PDCCH);
   transmit a request to lower a carrier aggregation level for one or more PDCCH candidates or an indication of a recommended carrier aggregation level for the one or more PDCCH candidates;
   restrict a number of search spaces for performing blind decoding of the PDCCH based on the power boost indication;
   monitor for the PDCCH with the indicated power boost from the base station in the restricted number of search spaces based on the power boost; and
   perform the blind decoding for at least a subset of the one or more PDCCH candidates with lowered carrier aggregation level or the recommended carrier aggregation level based on the request or the indication.

2. The apparatus of claim 1, wherein to receive the power boost indication, the at least one processor is configured to:
   receive the power boost indication in a group common downlink control information (DCI), a UE specific DCI, or a downlink media access control (MAC) control element (CE).

3. The apparatus of claim 1, wherein
   the one or more PDCCH candidates are associated with one or more carrier aggregation levels.

4. The apparatus of claim 3, wherein the one or more PDCCH candidates have the carrier aggregation levels below a threshold.

5. The apparatus of claim 3, wherein the at least one processor is further configured to:
   receive a configuration of the carrier aggregation levels for the one or more PDCCH candidates based on a power boost associated with each carrier aggregation level.

6. The apparatus of claim 3, wherein the at least one processor is further configured to:
   receive a configuration of the carrier aggregation levels for the one or more PDCCH candidates based on the request or the indication.

7. The apparatus of claim 1, wherein to transmit the request, the at least one processor is configured to transmit the request to the base station via an uplink control information (UCI) or an uplink media access control (MAC) control element (CE).

8. The apparatus of claim 1, wherein the at least one processor is further configured to:
indicate, to the base station, a UE capability or a power consumption limitation; and
perform the blind decoding for the one or more PDCCH candidates with a second carrier aggregation level below a threshold based on the UE capability or the power consumption limitation.

9. The apparatus of claim 8, wherein the UE capability is a reduced UE capability.

10. The apparatus of claim 1, wherein the power boost indication applies to each search space for the PDCCH.

11. The apparatus of claim 1, wherein the power boost indication applies to a subset of search spaces for the PDCCH.

12. The apparatus of claim 1, further comprising a transceiver coupled to the at least one processor, wherein to receive the power boost indication, the at least one processor is configured to receive the power boost indication via the transceiver.

13. The apparatus of claim 1, wherein the at least one processor is configured individually or in combination to receive the power boost indication, transmit the request or the indication, restrict the number of search spaces, and monitor for the PDCCH in the restricted number of search spaces, and perform the blind decoding.

14. A method of wireless communication at a user equipment (UE), comprising:
receiving, from a base station, a power boost indication for a physical downlink control channel (PDCCH);
transmitting a request to lower a carrier aggregation level for one or more PDCCH candidates or an indication of a recommended carrier aggregation level for the one or more PDCCH candidates;
restricting a number of search spaces for performing blind decoding of the PDCCH based on the power boost indication;
monitoring for the PDCCH with the indicated power boost from the base station in the restricted number of search spaces based on the power boost indication from the base station; and
performing the blind decoding for at least a subset of the one or more PDCCH candidates with lowered carrier aggregation level or the recommended carrier aggregation level based on the request or the indication.

15. The method of claim 14, wherein
the one or more PDCCH candidates are associated with one or more carrier aggregation levels.

16. The method of claim 15, wherein the one or more PDCCH candidates have the carrier aggregation levels below a threshold.

17. The method of claim 15, further comprising:
receiving a configuration of the carrier aggregation levels for the one or more PDCCH candidates based on a power boost associated with each carrier aggregation level.

18. The method of claim 15, further comprising:
receive a configuration of the carrier aggregation levels for the one or more PDCCH candidates based on the request or the indication.

19. The method of claim 14, further comprising:
indicating, to the base station, a UE capability or a power consumption limitation; and monitoring for the one or more PDCCH candidates with a second carrier aggregation level below a threshold based on the UE capability or the power consumption limitation.

20. An apparatus for wireless communication at a base station, comprising:
memory; and
at least one processor coupled to the memory and configured to:
transmit a power boost indication for a physical downlink control channel (PDCCH);
receive a request to lower a carrier aggregation level for one or more PDCCH candidates associated with the PDCCH or an indication recommending the carrier aggregation level for the one or more PDCCH candidates associated with the PDCCH based on the power boost indication;
apply a power boost to the one or more PDCCH candidates associated with the PDCCH; and
transmit the one or more PDCCH candidates associated with the PDCCH with the power boost and with lowered carrier aggregation level or recommended carrier aggregation level based on the request or the indication.

21. The apparatus of claim 20, wherein to transmit the power boost indication, the at least one processor is configured to transmit the power boost indication in a group common downlink control information (DCI), a UE specific DCI or a downlink media access control (MAC) control element (CE).

22. The apparatus of claim 20, wherein to apply the power boost, the at least one processor is configured to apply the power boost as a power concentrate over a control resource set (CORESET) bandwidth in which the PDCCH is transmitted or the power boost is applied to the PDCCH.

23. The apparatus of claim 20, wherein the at least one processor is further configured to:
transmit a configuration of the carrier aggregation level for at least a subset of one or more PDCCH candidates based on the power boost associated with each carrier aggregation level.

24. The apparatus of claim 20, wherein to receive the request or the indication, the at least one processor is configured to receive the request or the indication via an uplink control information (UCI) or an uplink media access control (MAC) control element (CE).

25. The apparatus of claim 20, wherein the at least one processor is further configured to:
Receive a UE capability or a power consumption limitation, wherein
the one or more PDCCH candidates are transmitted with the carrier aggregation level below a threshold based on the UE capability or the power consumption limitation.

26. The apparatus of claim 25, wherein the UE capability is a reduced UE capability.

27. The apparatus of claim 20, wherein the power boost indication applies to each search space for the PDCCH.

28. The apparatus of claim 20, wherein the power boost indication applies to a subset of search spaces for the PDCCH.

29. The apparatus of claim 20, further comprising a transceiver coupled to the at least one processor.

30. The apparatus of claim 20, wherein the at least one processor is configured individually or in combination to transmit the power boost indication, receive the request to lower the carrier aggregation level, apply the power boost to the one or more PDCCH candidates, and transmit the one or more PDCCH candidates.

31. A method of wireless communication at a base station, comprising:
- transmitting a power boost indication for a physical downlink control channel (PDCCH);
- receiving, from a user equipment (UE), a request to lower a carrier aggregation level for one or more PDCCH candidates associated with the PDCCH or an indication recommending the carrier aggregation level for the one or more PDCCH candidates associated with the PDCCH based on the power boost indication;
- applying a power boost to the one or more PDCCH candidates associated with the PDCCH; and
- transmitting the one or more PDCCH candidates associated with the PDCCH with the power boost and with lowered carrier aggregation level or recommended carrier aggregation level based on the request or the indication.

* * * * *